(12) United States Patent
Masuda et al.

(10) Patent No.: US 7,431,112 B2
(45) Date of Patent: Oct. 7, 2008

(54) HYBRID MOTORCYCLE

(75) Inventors: Tatsuyuki Masuda, Iwata (JP); Toshinori Fukudome, Iwata (JP); Shinji Sasamoto, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/675,452

(22) Filed: Feb. 15, 2007

(65) Prior Publication Data

US 2007/0256873 A1 Nov. 8, 2007

(30) Foreign Application Priority Data

Feb. 15, 2006 (JP) .............. 2006-038558

(51) Int. Cl.
*B60K 1/00* (2006.01)
(52) U.S. Cl. .............. 180/65.2; 180/65.5; 180/220; 180/227; 180/230
(58) Field of Classification Search .............. 180/65.2, 180/65.5, 220, 227, 230
See application file for complete search history.

(56) References Cited

U.S. PATENT DOCUMENTS

| | | | |
|---|---|---|---|
| 5,024,113 A * | 6/1991 | Ito et al. ............ | 74/6 |
| 6,155,366 A | 12/2000 | Lin | |
| 6,276,481 B1 * | 8/2001 | Matsuto et al. ............ | 180/220 |
| 6,736,227 B2 * | 5/2004 | Huang et al. ............ | 180/65.2 |
| 2006/0030454 A1 * | 2/2006 | Uchisasai et al. ............ | 477/77 |
| 2006/0090945 A1 * | 5/2006 | Ishida et al. ............ | 180/230 |

FOREIGN PATENT DOCUMENTS

| | | |
|---|---|---|
| EP | 1 270 302 A2 | 1/2003 |
| EP | 1 518 737 A | 3/2005 |
| EP | 1 574 379 A | 9/2005 |
| JP | 08 175474 A | 7/1996 |
| WO | WO 2004/054836 A | 7/2004 |

OTHER PUBLICATIONS

European Search Report for European Application No. EP 07 00 3224 dated Apr. 24, 2007.

\* cited by examiner

*Primary Examiner*—Christopher Ellis
*Assistant Examiner*—Katy Meyer
(74) *Attorney, Agent, or Firm*—Knobbe, Martens, Olson & Bear, LLP

(57) ABSTRACT

A hybrid motorcycle capable of mounting thereon a hybrid-type drive unit, which does not project in a vehicle width direction and can be mounted even on a motorcycle having a limited vehicle width, includes a power distributing device positioned between a generator and a motor, and a reduction device arranged rearwardly of the power distributing device. A front end of a drive-wheel transmission device is journaled on a rear end of a central storage casing so that a rear end side of the drive-wheel transmission device is vertically swingable, and a rear wheel is journaled on the rear end of the drive-wheel transmission device. The power distributing device includes a sun gear, planetary gears, a planetary carrier, and a ring gear. Further, a carrier shaft projects from a rotor shaft and rotation of a crank shaft is transmitted through a intermediate gear portion to the projecting end of the carrier shaft.

11 Claims, 13 Drawing Sheets

[Fig. 1]
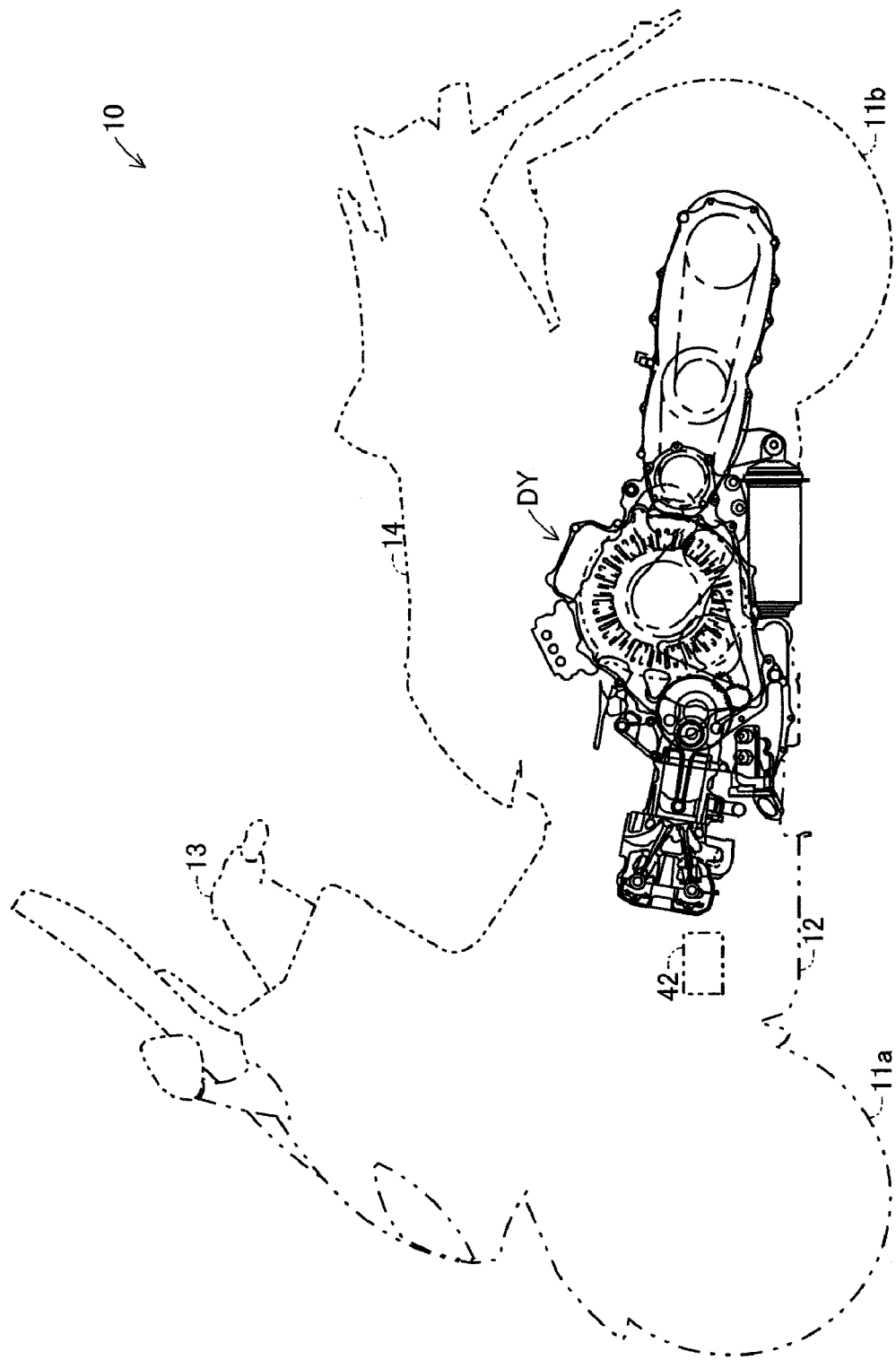

[Fig. 2]
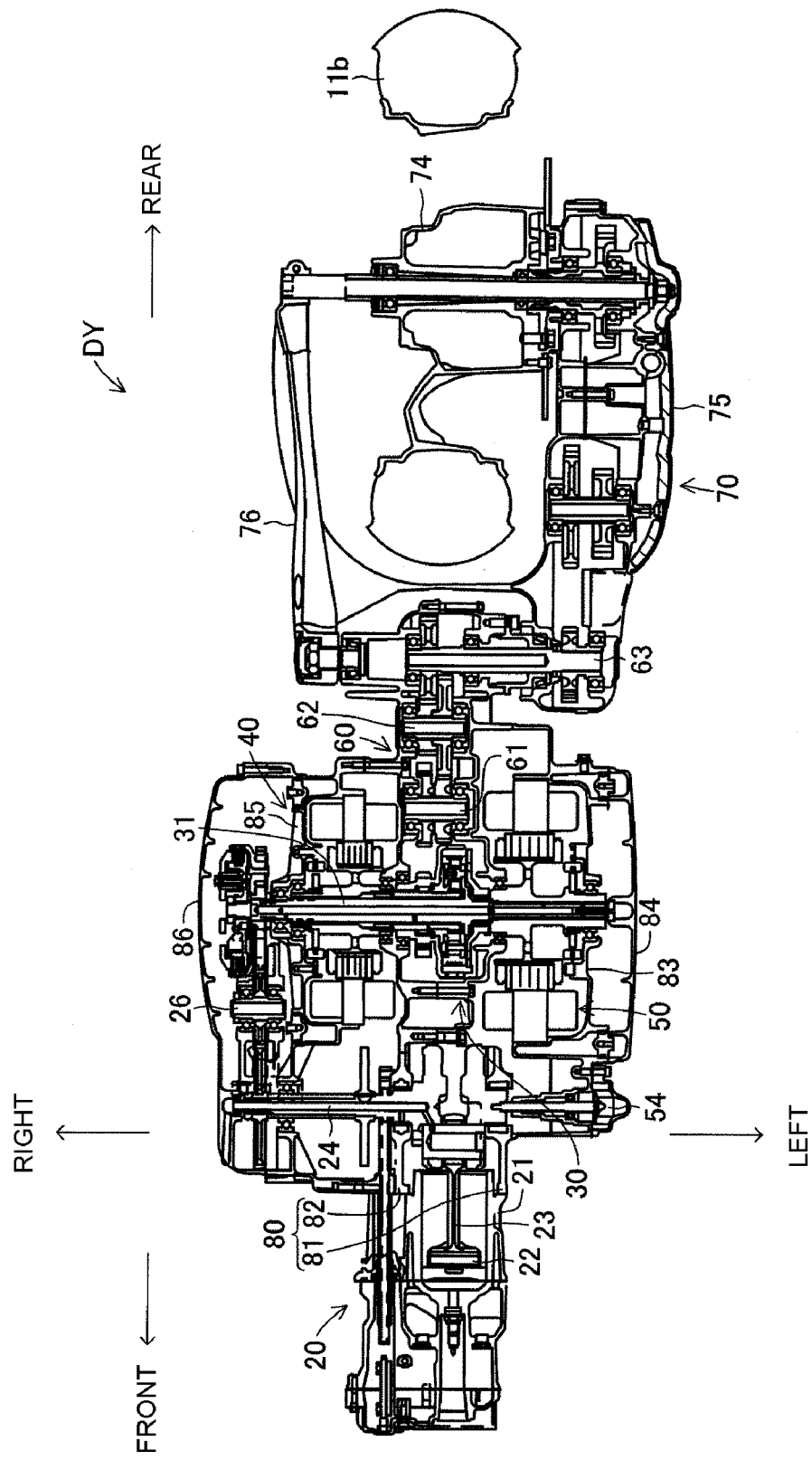

[Fig. 3]
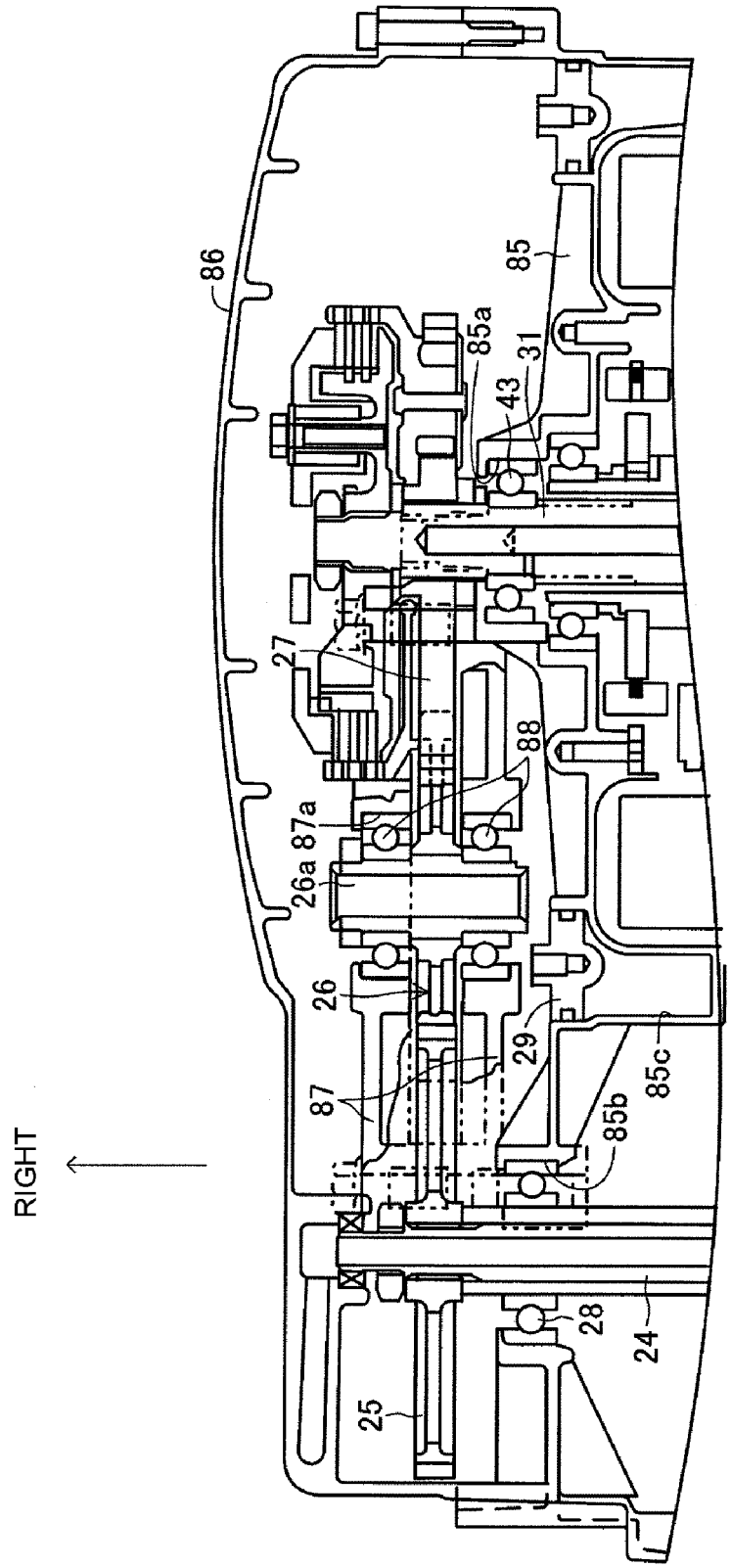

[Fig. 4]
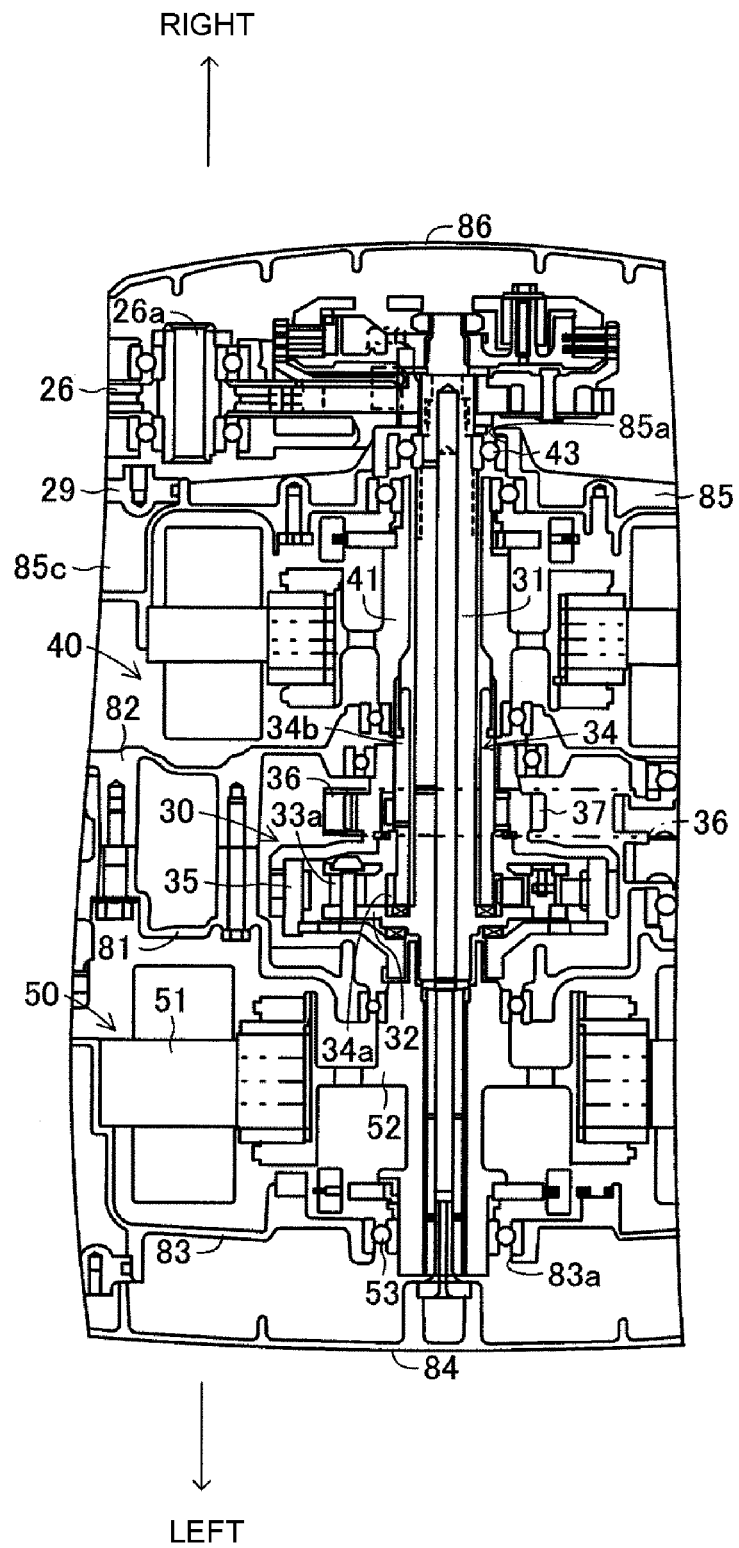

[Fig. 5]
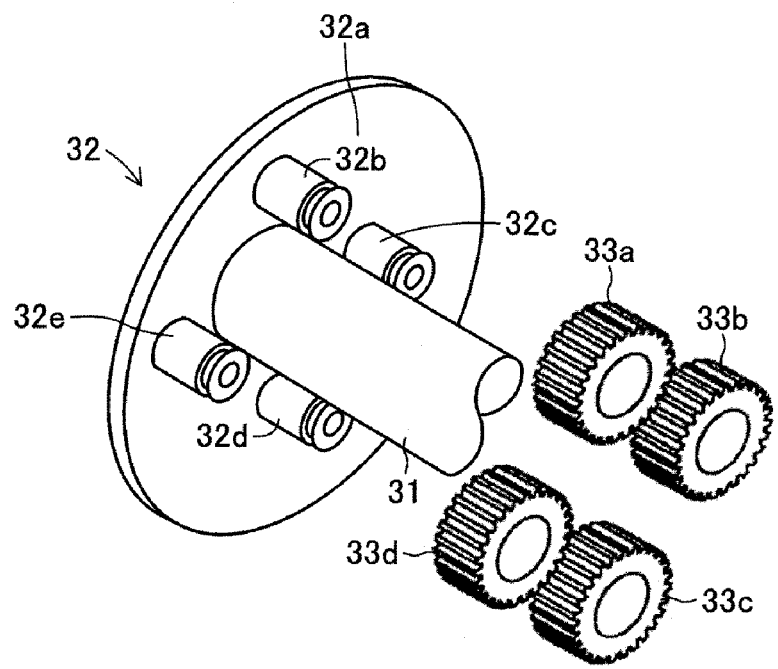
[Fig. 6]
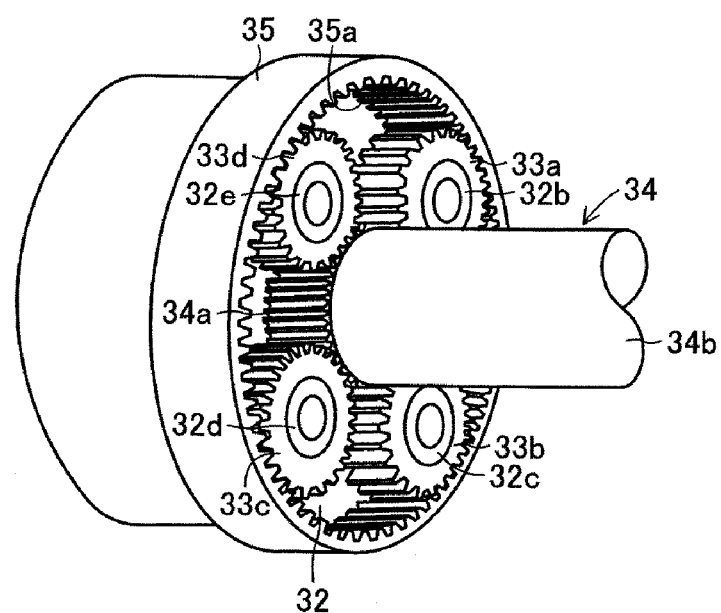

[Fig. 7]
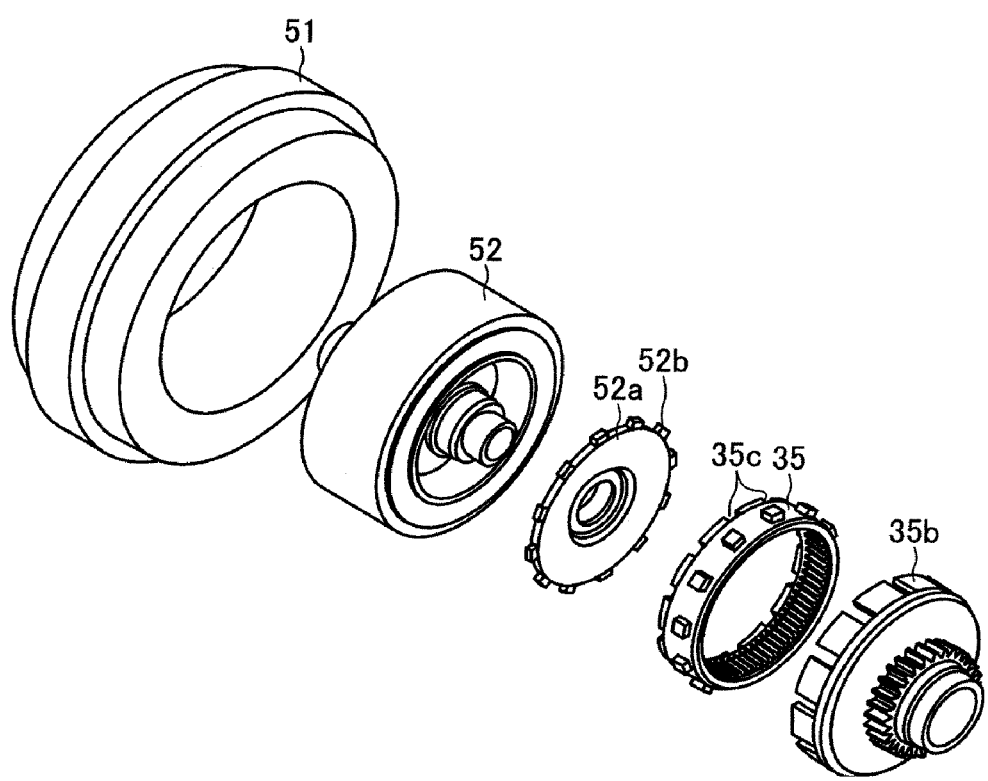

[Fig. 8]
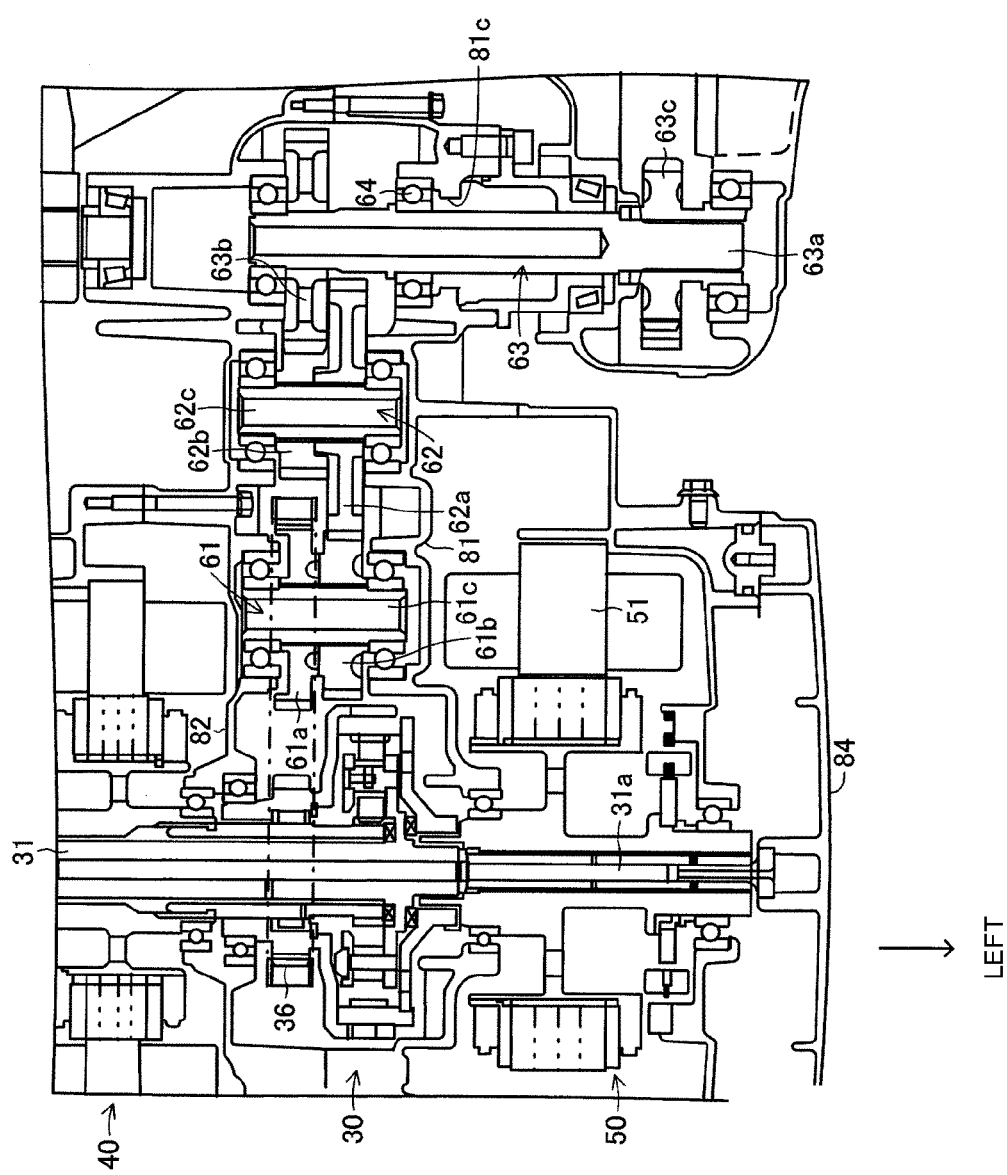

[Fig. 9]
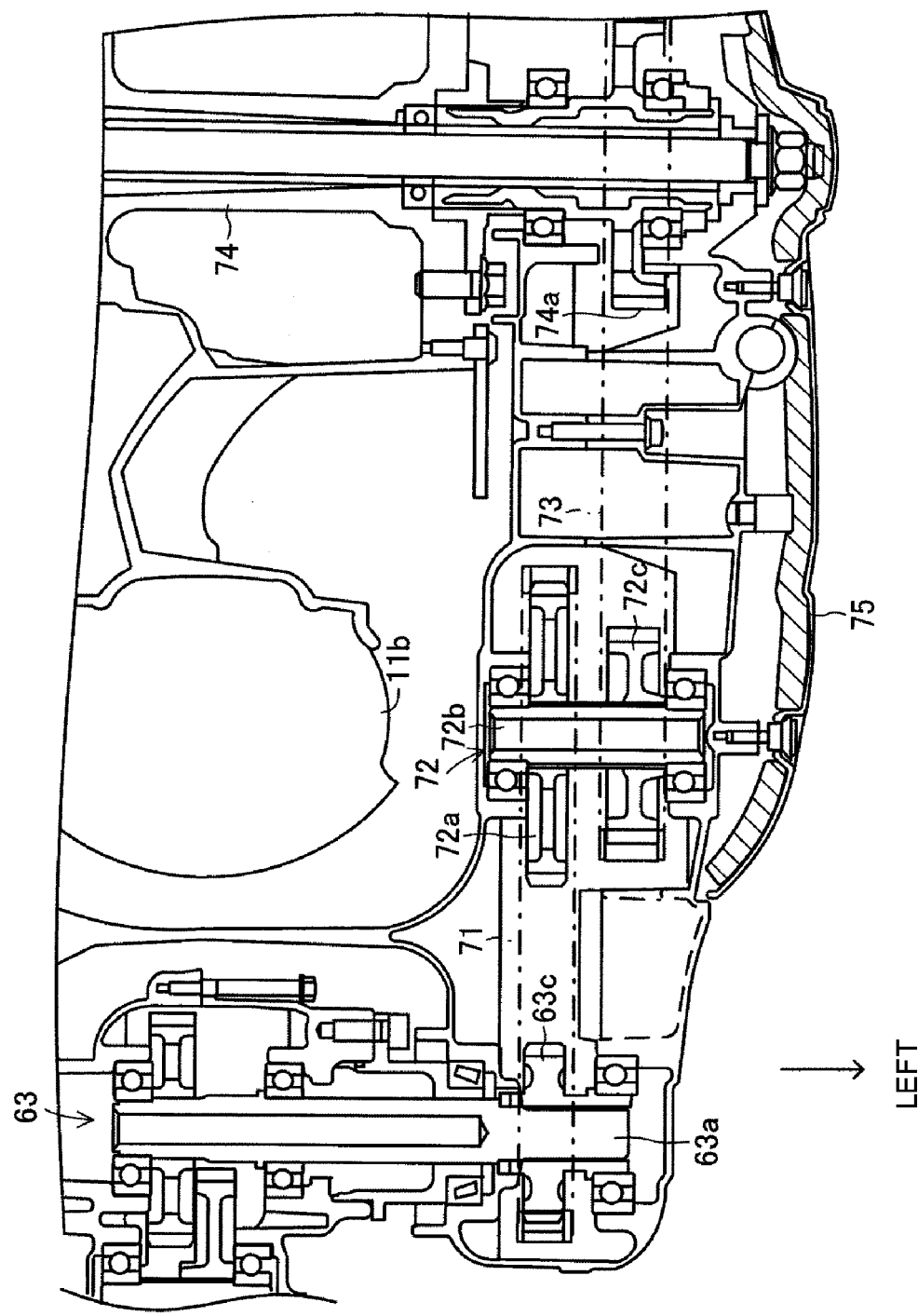

[Fig. 10]
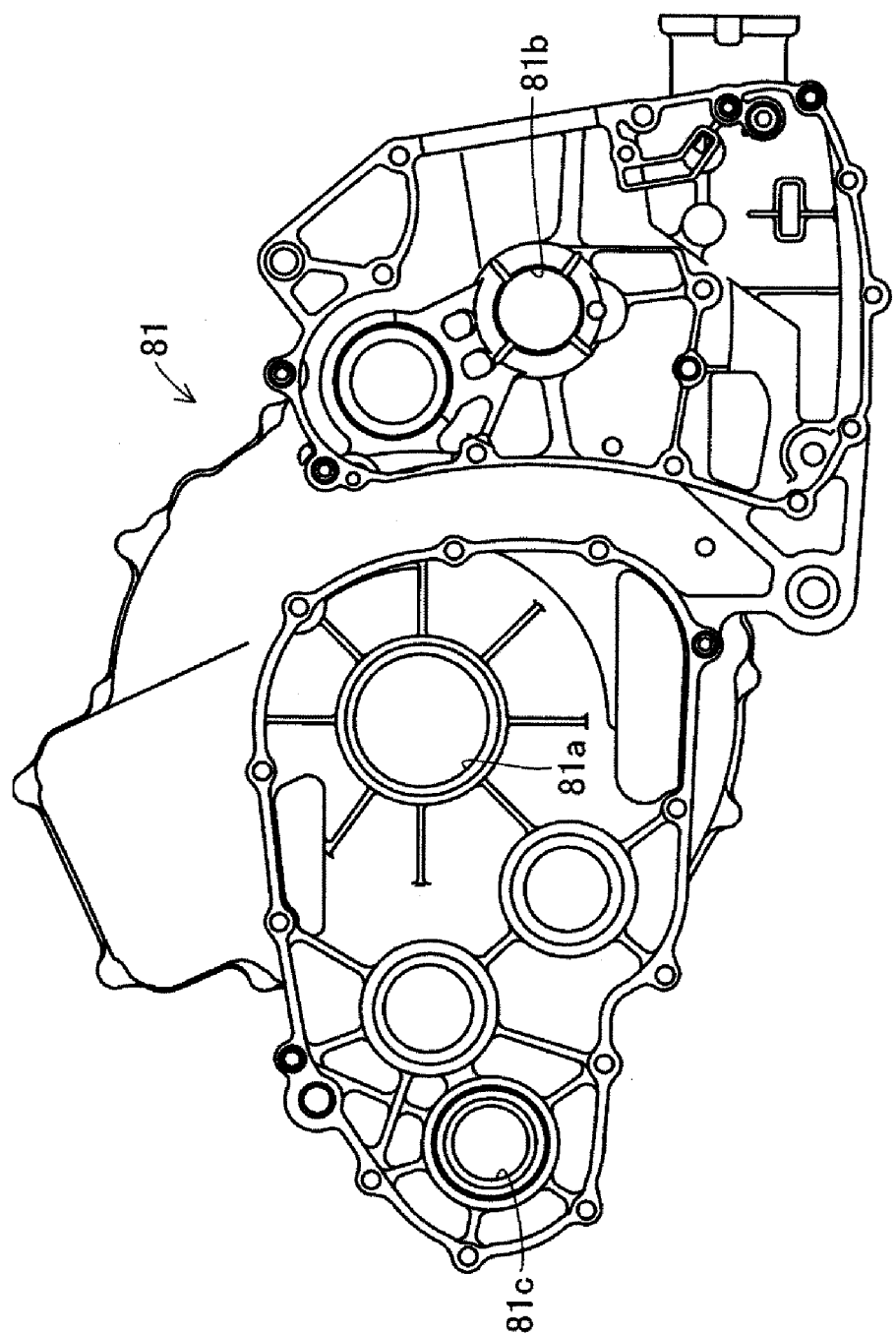

[Fig. 11]
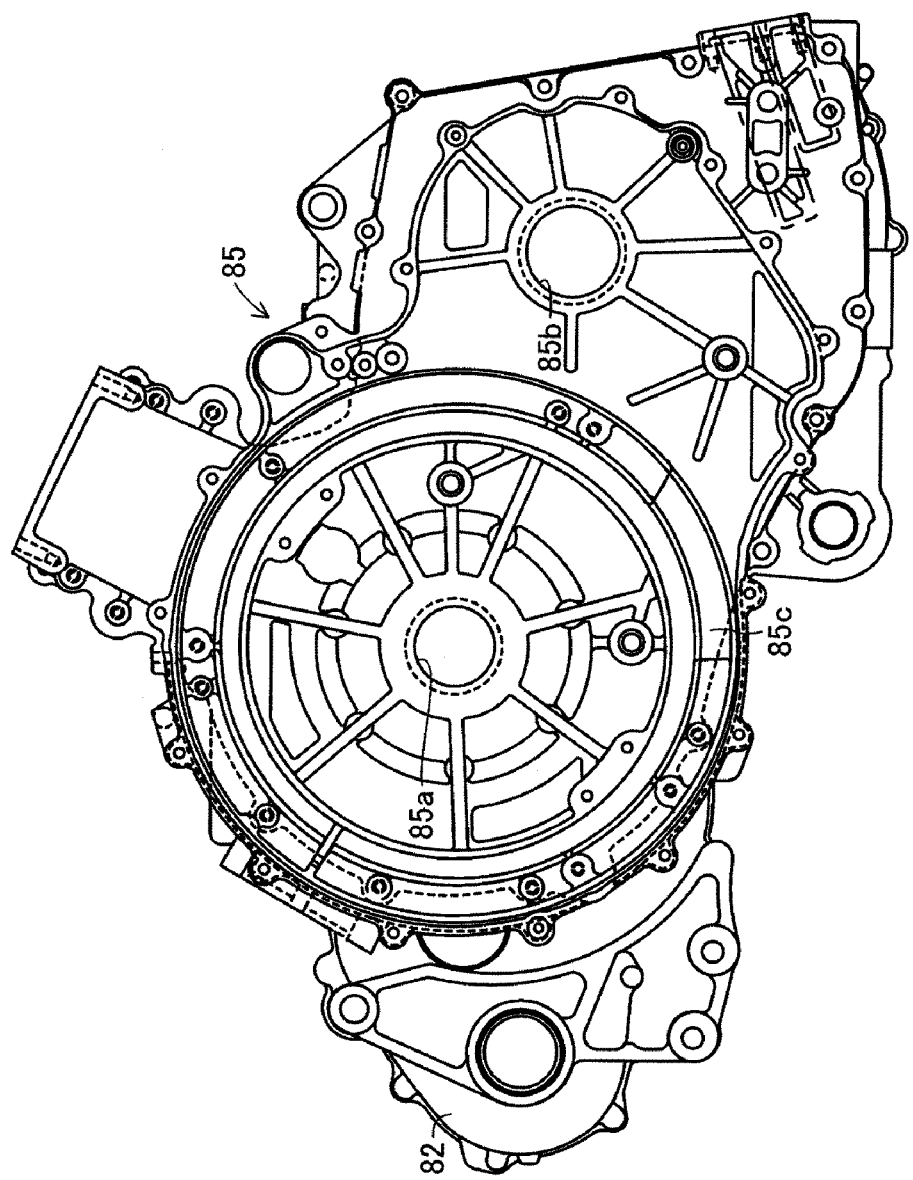

[Fig. 12]
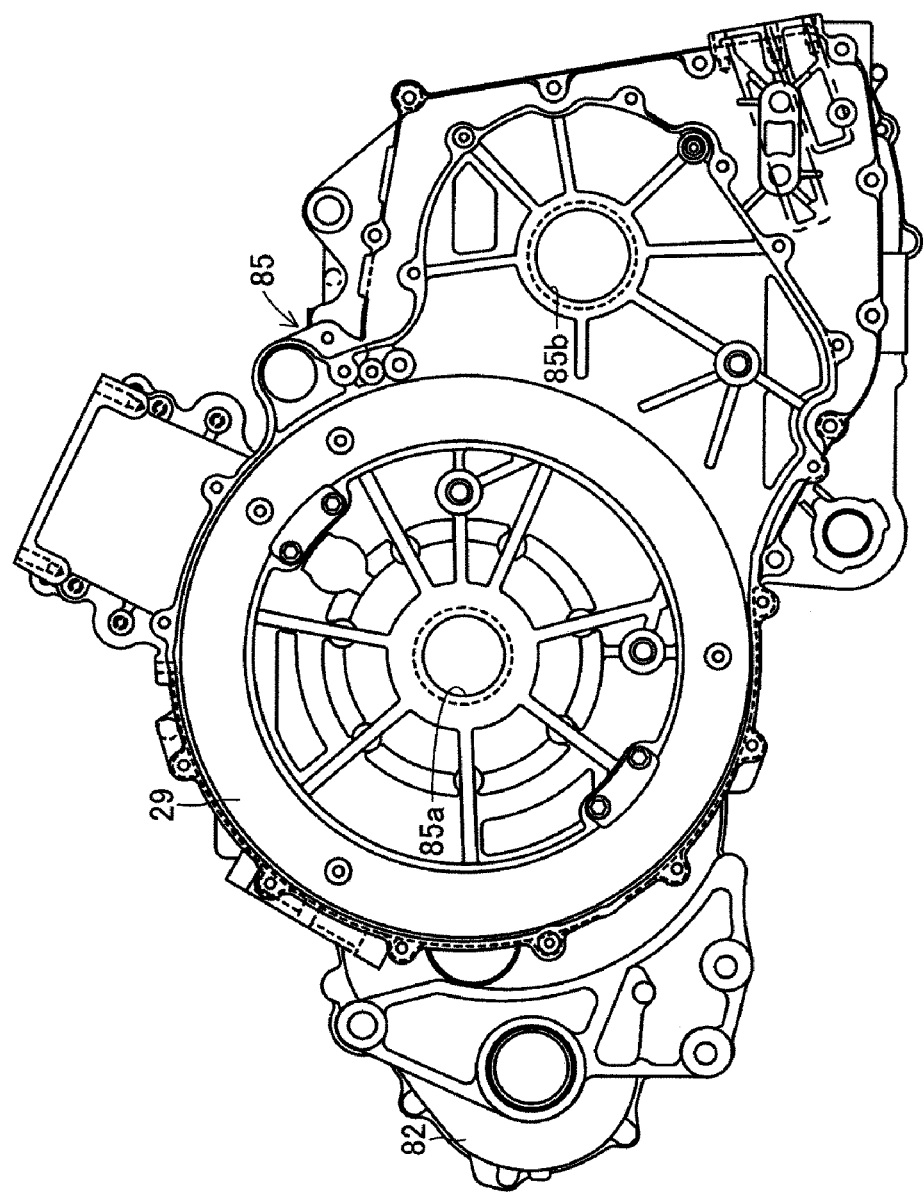

[Fig. 13]
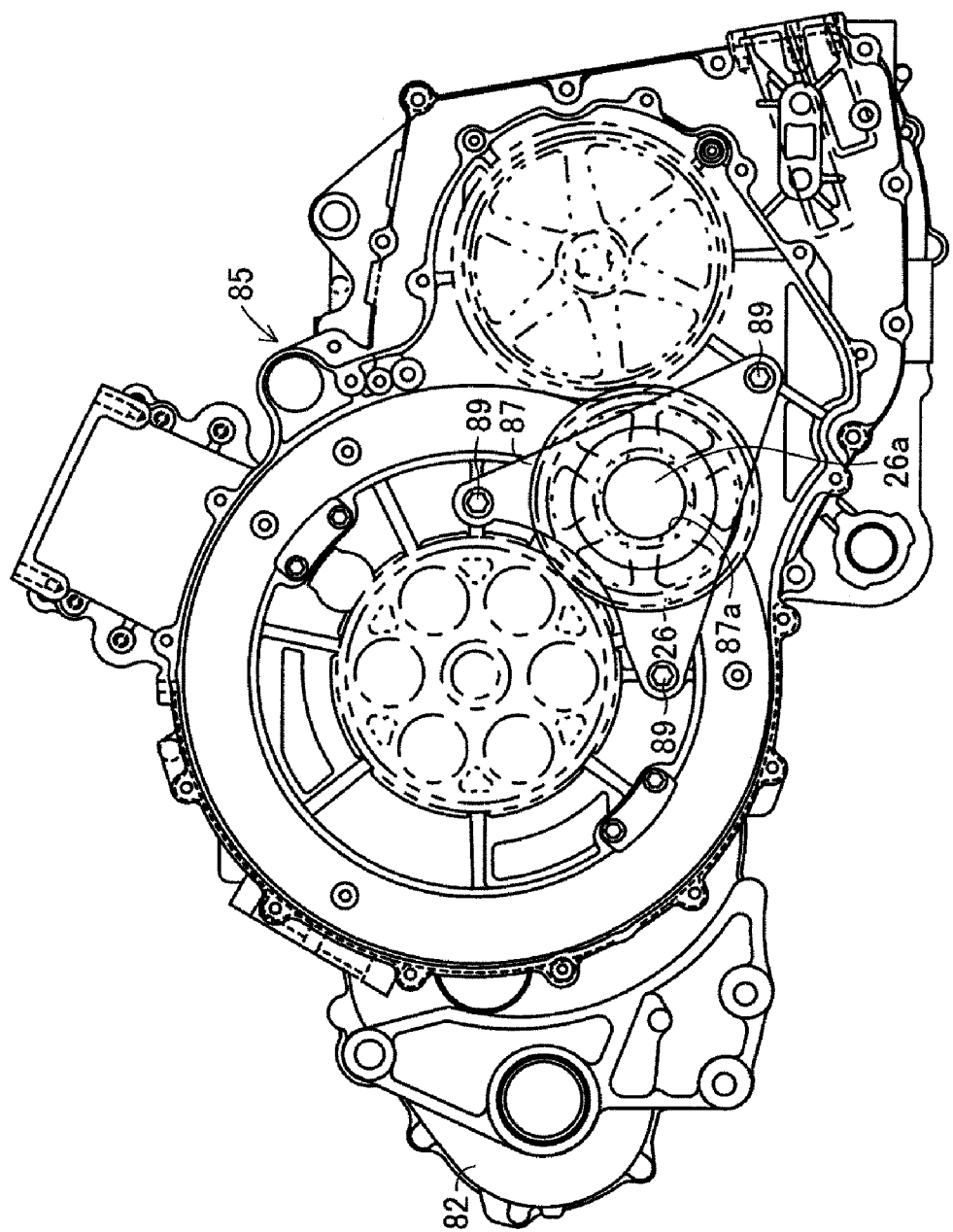

[Fig. 14]
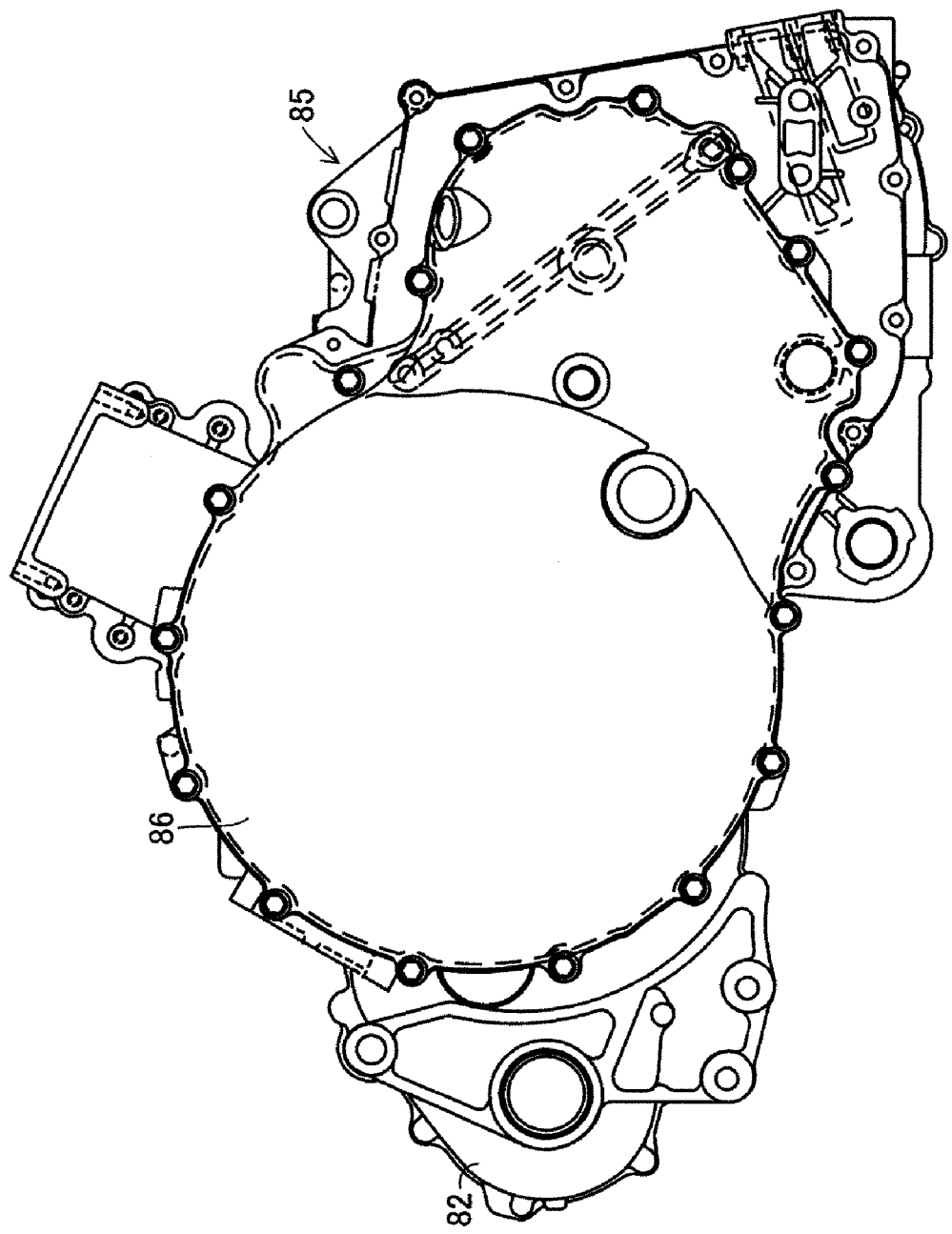

HYBRID MOTORCYCLE

CROSS-REFERENCE TO RELATED APPLICATIONS

The present application is based on and claims priority under 35 U.S.C. § 119 to Japanese Patent Application No. 2006-038558, filed on Feb. 15, 2006, the entire contents of which are expressly incorporated by reference herein.

BACKGROUND OF THE INVENTION

1. Field of the Invention

The present invention relates to a hybrid motorcycle propelled by an engine and an electric motor.

2. Description of the Related Art

While conventional vehicles generally operate by driving the rotation of a wheel or wheels via an engine, hybrid vehicles (see, for example, JP 2000-343964) utilize a drive motor in addition to an engine to operate. Such a hybrid vehicle includes an engine with an output shaft, a drive shaft, to which power output from the engine is transmitted through a power regulator, a generator having a rotating shaft, and a switching mechanism, which switches and joins the rotating shaft of the generator to the output shaft and the drive shaft. The engine, the generator, the switching mechanism, and the motor are arranged in series on the same axis across the width of the vehicle.

Since conventional hybrid vehicles described above are four-wheeled vehicles having a large vehicle width, however, the engine, the generator, the switching mechanism, and the motor can readily be arranged in the vehicle width direction. However, such a hybrid-type drive unit cannot easily be provided on a motorcycle, which has a small vehicle width. Additionally, when the hybrid-type drive unit is provided on a motorcycle, the drive unit disadvantageously projects considerably in a vehicle width direction from the vehicle body, affecting, for example, the weight distribution and aerodynamics of the motorcycle.

SUMMARY OF THE INVENTION

In view of the circumstances noted above, an aspect of at least one of the embodiments disclosed herein is to provide a hybrid motorcycle capable of mounting thereon a hybrid-type drive unit that does not project in a vehicle width direction and can be mounted even on a motorcycle having a limited vehicle width.

In accordance with one aspect of the present invention, a hybrid two-wheeled vehicle is provided, comprising an engine comprising a crank shaft extending in a direction generally transverse to a longitudinal axis of the motorcycle, and a generator configured to generate electric power upon rotation of the crank shaft of the engine. The vehicle also comprises an electric motor driven by at least the electric power generated by the generator, the motor configured to rotate a drive wheel via at least a reduction device and a drive-wheel transmission device, and a power distributing device configured to distribute a crank shaft drive force generated by the engine to at least the generator and the reduction device. The generator, the motor, and the power distributing device are arranged on an axis that is rearwardly spaced from and generally parallel to the crank shaft, and are disposed such that the power distributing device is positioned between the generator and the motor, the reduction device being arranged rearwardly of the power distributing device, and a front end of the drive-wheel transmission device being journaled on a reduction device storage casing that receives therein the reduction device, so that a rear end of the drive-wheel transmission device is vertically swingable and the drive wheel is journaled on a rear end of the drive-wheel transmission device.

In accordance with another aspect of the present invention, a hybrid two-wheeled vehicle is provided, comprising an engine comprising a crank shaft extending in a direction generally transverse to a longitudinal axis of the motorcycle, a generator configured to generate electric power at least upon rotation of the crank shaft, and an electric motor driven by at least the electric power generated by the generator, the motor configured to rotate a drive wheel of the motorcycle via at least a reduction device and a drive-wheel transmission device. The vehicle also comprises a power distributing device configured to distribute a drive force generated by the engine to at least the generator and the reduction device. The generator, the motor, and the power distributing device are arranged on an axis that is rearwardly spaced from and generally parallel to the crank shaft, and are disposed such that the power distributing device is positioned between the generator and the motor.

BRIEF DESCRIPTION OF THE DRAWINGS

These and other features, aspects and advantages of the present inventions will now be described in connection with preferred embodiments, in reference to the accompanying drawings. The illustrated embodiments, however, are merely examples and are not intended to limit the inventions. The drawings include the following 14 figures.

FIG. 1 is a schematic side view showing one embodiment of a hybrid motorcycle.

FIG. 2 is a cross-sectional schematic view showing a drive unit provided on the hybrid motorcycle.

FIG. 3 is a cross-sectional schematic view showing the relationship of connection between a crank shaft and a carrier shaft.

FIG. 4 is a cross-sectional schematic view showing an arrangement of a generator, a power distributing device, and a motor.

FIG. 5 is an exploded, perspective schematic view showing a planetary gear mechanism.

FIG. 6 is a perspective schematic view showing a state, in which a ring gear is assembled to the planetary gear mechanism.

FIG. 7 is an exploded, perspective schematic view showing the motor and the ring gear.

FIG. 8 is a cross-sectional schematic view showing a reduction device.

FIG. 9 is a cross-sectional schematic view showing a drive-wheel transmission device.

FIG. 10 is a schematic side view showing a left side casing of a central storage casing.

FIG. 11 is a schematic side view showing the central storage casing.

FIG. 12 is a schematic side view showing a state, in which a closure member is mounted to a cooling water channel of the central storage casing shown in FIG. 11.

FIG. 13 is a schematic side view showing a state, in which an intermediate gear portion is mounted to the central storage casing through a journal member.

FIG. 14 is a schematic side view showing a state, in which a right side cover portion is mounted to the intermediate storage casing.

DETAILED DESCRIPTION OF THE PREFERRED EMBODIMENT

In the following detailed description, terms of orientation such as "right," "left," "front," "rear," "frontward," and "rearward" are used herein to simplify the description of the context of the illustrated embodiments. Moreover, left, right, front and rear directions are described hereinbelow as directions as seen from a driver seated on a seat of a vehicle, such as a motorcycle. Likewise, terms of sequence, such as "first" and "second," are used to simplify the description of the illustrated embodiments. Because other orientations and sequences are possible, however, the present invention should not be limited to the illustrated orientation. Those skilled in the art will appreciate that other orientations of the various components described above are possible.

FIG. 1 shows one embodiment of a hybrid motorcycle 10 and FIG. 2 shows one embodiment of a hybrid type drive unit DY, which can be used with the hybrid motorcycle 10. The hybrid motorcycle 10 comprises a front wheel 11a and a rear wheel 11b, and the drive unit DY can be arranged below a center of a vehicle body 12 formed between the front wheel 11a and the rear wheel 11b. Also, a handle 13 provided with an accelerator grip and a brake lever (not shown) is provided on a front, upper portion of the vehicle body 12, and a seat 14 is provided above the center of the vehicle body 12. The shape of the motorcycle 10 is not limited to that shown in FIG. 1, nor are other conditions of the vehicle limited thereto. Additionally, the inventions disclosed herein are not limited to a so-called motorcycle-type two-wheel vehicle, but are applicable to other types of two-wheel vehicles. Moreover, the inventions disclosed herein are not limited to two-wheel vehicles, but may be used with other types of straddle-type vehicle. Furthermore, some aspects of the invention disclosed herein are not limited to straddle-type vehicles, but can also be used with vehicles with side-by-side seating.

The drive unit DY can have an engine 20, a power distributing device 30, a generator 40, and an electric motor 50. The hybrid motorcycle 10 can be a series-parallel hybrid type motorcycle, in which the engine 20 and the motor 50, which serve as a power source for the motorcycle 10, individually or in combination drive the rear wheel 11b to propel the motorcycle 10. That is, the power distributing device 30 distributes a drive force, which is generated by the engine 20, to drive the rear wheel 11b on one hand and to drive the generator 40 on the other hand to generate electric power. Electric power generated by the generator 40 can be used to operate the electric motor 50 to drive the rear wheel 11b. Preferably, a ratio of a drive force distributed by the power distributing device 30 can be controlled based on a running state of the hybrid motorcycle 10.

Also, as shown in FIG. 2, the power distributing device 30, the generator 40, and the motor 50 can be aligned along a common axis that is disposed rearwardly of the engine 20. These components can be arranged in a side-by-side relationship so as not to increase the vehicle's width. In the illustrated embodiment, the power distributing device 30 is disposed between the generator 40 and the motor 50. The engine 20 can be a water-cooled type single cylinder engine, in which a piston 22 can reciprocate in a fore-and-aft direction inside a cylinder 21. Reciprocating movement of the piston 22 can be transmitted through a connecting rod 23 to a crank shaft 24, which is arranged with an axial direction thereof oriented in the vehicle width direction, to rotate the crank shaft 24 about a central axis thereof Also, when the crank shaft 24 is rotated while the engine 20 is turned off, the piston 22 reciprocates backward and forward in the cylinder 21 to enable starting the engine 20. Also, as seen in FIG. 2, the crank shaft 24 can extend toward the right in the vehicle width direction rearward of the engine 20. As shown in FIG. 3, the crank shaft 24 is provided on a right end thereof with a crank gear 25, and a forwardly positioned portion of an intermediate gear portion 26 meshes with a rear side of the crank gear 25. A rearwardly positioned portion of the intermediate gear portion 26 meshes with a forwardly positioned portion of a connection gear 27 provided on an end-side peripheral surface of a carrier shaft 31, which is provided on the power distributing device 30.

Accordingly, when the engine 20 is actuated to rotate the crank shaft 24, a rotating drive force of the crank shaft 24 is transmitted to the carrier shaft 31 through the crank gear 25, the intermediate gear portion 26, and the connection gear 27, so that the carrier shaft 31 rotates. The intermediate gear portion 26 cooperates with the crank gear 25 and the connection gear 27 to constitute a drive force transmission mechanism that receives power generated in the engine 20 from the crank shaft 24 and transmits the same to the power distributing device 30.

Also, as shown in FIG. 4, the carrier shaft 31 can be arranged rearwardly of and parallel to the crank shaft 24. Also, a shaft portion 26a of the intermediate gear portion 26 can also be arranged parallel to the crank shaft 24 and the carrier shaft 31. Respective members, which constitute the power distributing device 30, except for the carrier shaft 31, can be arranged on a left end of the carrier shaft 31, the generator 40 is arranged on the right, and the motor 50 is arranged on the left.

The power distributing device 30 disposed on the left side of the carrier shaft 31 can include a planetary gear mechanism. Such a planetary gear mechanism can include a planetary carrier 32 formed on an outer peripheral surface of the carrier shaft 31, as shown in FIGS. 5 and 6, four cylindrical-shaped planetary gears 33a, 33b, 33c, 33d, which can have teeth formed on peripheral surfaces thereof, a sun gear 34, and a ring gear 35. In addition, the planetary gears may be three or five in number and can be arranged uniformly in a circumferential direction. The planetary carrier 32 can have a flange-shaped body 32a formed integral with an outer peripheral surface of the carrier shaft 31, and can have planetary pins 32b, 32c, 32d, 32e in equal number to the planetary gears 33a-e, the planetary pins formed at predetermined intervals concentrically about the carrier shaft 31, a central axis of the planetary pins 32b-e can be a center of the carrier shaft 31.

The planetary gears 33a, 33b, 33c, 33d, respectively, are mounted rotatably to the planetary pins 32b, 32c, 32d, 32e. Also, the sun gear 34 preferably has a cylindrical-shaped shaft body mounted to the peripheral surface of the carrier shaft 31 to be rotatable relative to the carrier shaft 31 and is provided to extend from a portion of the peripheral surface of the carrier shaft 31 opposite the planetary gears 33a, 33b, 33c, 33d to a portion thereof corresponding to a left portion of the generator 40. A sun gear portion 34a (see FIG. 6) that can mesh with the planetary gears 33a, 33b, 33c, 33d can be formed on that portion of the peripheral surface of the sun gear 34, which is opposite the planetary gears 33a, 33b, 33c, 33d, and a right end of the sun gear 34 can mesh in spline structure with a left end of a rotor shaft 41 of the generator 40.

Accordingly, the planetary gears 33a, 33b, 33c, 33d together with the planetary carrier 32 revolve round the sun gear portion 34a while rotating about the planetary pins 32b, 32c, 32d, 32e. The ring gear 35 is formed in a manner to cover the gear portion of the sun gear 34, the planetary carrier 32, and the planetary gears 33a, 33b, 33c, 33d and has formed on an inner peripheral surface thereof a gear portion 35a that meshes with the planetary gears 33a, 33b, 33c, 33d.

In addition, FIG. 6 does not show the whole of the ring gear 35 but only a left side portion thereof. Also, as shown in FIGS. 4 and 8, a sprocket 37 is formed on a side portion of the generator 40 on an outer peripheral surface of the ring gear 35 and a chain 36 is trained round the sprocket 37. The chain 36 is extended toward a first reduction gear portion 61 of a reduction device 60, as described below. Therefore, a rotating drive force transmitted to the carrier shaft 31 is transmitted to the reduction device 60 through the planetary gears 33a, 33b, 33c, 33d, the ring gear 35, and the chain 36.

The generator 40 can be arranged on an outer peripheral side of the carrier shaft 31 so that the rotor shaft 41 is coaxially rotatable with the carrier shaft 31, and the left end of the rotor shaft 41 can mesh via, for example, a spline structure with a right end of a sun gear shaft 34b. Therefore, when the sun gear 34 rotates, its rotating drive force is transmitted to the rotor shaft 41, so that the rotor shaft 41 rotates. The generator 40 is actuated upon rotation of the rotor shaft 41 to generate electric power, and the generated electric power can be supplied to a battery 42 (see FIG. 1) and the motor 50. Conversely, when electric power is supplied to the generator 40, the rotor shaft 41 of the generator 40 rotates to also enable rotation of the sun gear 34. In addition, the battery 42 can be electrically connected to the generator 40 and the motor 50 to supply electric power to the motor 50 to operate the motor 50. As noted above, the battery 42 can also accumulate electric power generated by the motor 50 and the generator 40.

The motor 50 can have, as shown in FIG. 7, a stator 51, which can be formed to be substantially ring-shaped, and a motor shaft 52 provided inside the stator 51. A disk 52a can be provided with pawls 52b and can mesh via a spline structure with a right end of the motor shaft 52. Also, a plurality of engagement recesses 35c engageable with the pawls 52b can be formed on a left side of the ring gear 35. The ring gear 35 and the motor shaft 52 can be joined by engaging the engagement recesses 35c and the pawls 52b with each other.

Therefore, when the motor shaft 52 rotates, the ring gear 35 also rotates about the carrier shaft 31 on the outer peripheral side of the carrier shaft 31. Also, as described above, the sprocket 37 can be formed on a right partial, peripheral surface of the ring gear 35, and the chain 36 connected to a side of the reduction device 60 can be trained around the sprocket 37. Therefore, when electric power is supplied from the battery 42 to drive the motor 50, the drive force is transmitted to the reduction device 60 through the sprocket 37 of the ring gear 35, which is rotated as the motor shaft 52 rotates, and the chain 36. Also, the motor 50 can regenerate electric power and generate a resistance force to inhibit rotation of the rear wheel 11b when the motor shaft 52 is caused by torque of the rear wheel 11b to rotate as the speed of the hybrid motorcycle 10 decreases through a breaking action.

As shown in FIG. 8, the reduction device 60 can have a second reduction gear portion 62 and a third reduction gear portion 63, as well as the first reduction gear portion 61. The first reduction gear portion 61 can have a sprocket portion 61a, which meshes with the chain 36, a gear portion 61b aligned and arranged coaxially with the sprocket portion 61a, and a shaft portion 61c, which supports the sprocket portion 61a and the gear portion 61b. The first reduction gear portion 61 transmits a rotating drive force of the ring gear 35, which is transmitted to the sprocket portion 61a through the chain 36, to the second reduction gear portion 62.

With continued reference to FIG. 8, the second reduction gear portion 62 can have a gear portion 62a that meshes with the gear portion 61b of the first reduction gear portion 61, a gear portion 62b aligned and arranged coaxially with the gear portion 62a, and a shaft portion 62c that supports the gear portion 62a and the gear portion 62b. The second reduction gear portion 62 transmits a rotating drive force from the first reduction gear portion 61 through the gear portion 62a to the third reduction gear portion 63.

The third reduction gear portion 63 can have a shaft portion 63a that is longer than the shaft portion 61c of the first reduction gear portion 61 and the shaft portion 62c of the second reduction gear portion 62, a gear portion 63b that meshes with the gear portion 62b of the second reduction gear portion 62, and a sprocket 63c arranged on a left end side of the shaft portion 63a and coaxially with the gear portion 63b. The shaft portions 61c, 62c, 63a can be arranged in parallel in the fore-and-aft direction. Additionally, the right end of the shaft portion 63a can be aligned with the right ends of the shaft portions 61c, 62c, while the length of the shaft 63a extends toward the left side of the motorcycle 10.

As shown in FIG. 9, a chain 71 can extend rearward and be trained around the sprocket 63c of the third reduction gear portion 63. A rearwardly positioned portion of the chain 71 can also be trained around a sprocket 72a of a power transmission gear 72. The power transmission gear 72 can include the sprocket 72a, a shaft portion 72b that supports the sprocket 72a, and a sprocket 72c arranged on a left side of the shaft portion 72b and coaxially with the sprocket 72a.

Also, a chain 73 can extend rearward toward a center of the rear wheel 11b and be trained around the sprocket 72c of the power transmission gear 72. A sprocket 74a can be provided on a peripheral surface of a left portion of a wheel 74, which journals the rear wheel 11b, and a portion of the chain 73 positioned toward a rear end thereof can be trained round the sprocket 74a. Therefore, the power transmission gear 72, which receives a drive force from the third reduction gear portion 63 through the chain 71, can transmit the drive force to the rear wheel 11b through the chain 73 and the wheel 74 to drive the rear wheel 11b.

A rear-wheel drive force transmission line, which can drive the rotation of the rear wheel 11b, can include the chain 36, the first reduction gear portion 61, the second reduction gear portion 62, the third reduction gear portion 63, the chain 71, the power transmission gear 72, the chain 73, and the sprocket 74a of the wheel 74. A left end side portion of the third reduction gear portion 63, the chain 71, the power transmission gear 72, the chain 73, and the wheel 74 can be accommodated in an arm portion 75. An arm portion 76 (see FIG. 2) extending in the fore-and-aft direction can also be provided between a right portion of a wheel 74 and a right portion of the third reduction gear portion 63.

One embodiment of a drive-wheel transmission device 70 can include the sprocket 63c of the third reduction gear portion 63, the chain 71, the power transmission gear 72, the chain 73, the wheel 74, and the arm portions 75, 76. The drive-wheel transmission device 70 can be mounted to a rear end of a reduction-device storage casing (e.g., a rear side portion of a central storage casing 80, described further below) that receives the reduction device 60 therein and allows the reduction device 60 to swing in a vertical direction.

Also, respective devices provided on the drive unit DY can be assembled via respective casing members, fixation members such as bolts, bearing members, etc. That is, a central storage casing 80 can have a left side casing 81 and a right side casing 82 that extend longitudinally to the third reduction gear portion 63 from a rear end of the cylinder 21. An intermediate storage casing 83 can be fixed to a left side of the left side casing 81 and a left cover portion 84 can be fixed to a left side of the intermediate storage casing 83. Also, an intermediate storage casing 85 can be fixed to a right side of the right side casing 82 and a right cover portion 86 can be fixed to a right side of the intermediate storage casing 85.

A central portion of the crank shaft 24, portions of the power distributing device 30 except a portion of the carrier shaft 31 toward the generator 40, and the reduction device 60 can be accommodated in the central storage casing 80. That is, a front side of the central storage casing 80 can be a crank case that journals the crank shaft 24, a central portion of the central storage casing can be a power distributing device storage casing that accommodates therein the power distributing device 30, and a rear portion of the central storage casing 80 can be a reduction-device storage casing that accommodates therein the reduction device 60.

FIG. 10 shows the left side casing 81, a hole 81a formed centrally of the left side casing 81 to permit the carrier shaft 31 to extend therethrough, and a hole 81b formed on a front side portion of the left side casing to permit a left end side portion of the crank shaft 24 to extend therethrough. Also, a hole 81c formed on a rear side portion of the left side casing 81 permits the shaft portion 63a of the third reduction gear portion 63 to extend therethrough and supports the shaft portion 63a rotatably via a bearing 64 (see FIG. 8) therebetween. The right side casing 82 can be formed to be a mirror image of the left side casing 81.

The motor 50 is accommodated between the left side casing 81 of the central storage casing 80 and the intermediate storage casing 83. The left side casing 81 and the intermediate storage casing 83 can be assembled together through a fixation member and a hole 83a can be formed centrally of the intermediate storage casing 83 to permit the motor shaft 52 to extend therethrough and to support the motor shaft 52 via a bearing 53 (see FIG. 4) therebetween. A cooling water pump 54 can be mounted to a front end of the intermediate storage casing 83 to supply cooling water to respective devices provided on the drive unit DY. A portion of the left side of the intermediate storage casing 83, except the cooling water pump 54, can be covered by the left cover portion 84.

The generator 40 can be accommodated between the intermediate storage casing 85 and the right side casing 82. The right side casing 82 and the intermediate storage casing 85 can be assembled together through a fixation member and a hole 85a can be formed centrally of the intermediate storage casing 85 to permit the carrier shaft 31 to extend therethrough and to support the carrier shaft 31 via a bearing 43 therebetween (see FIGS. 4 and 11). Also, a hole 85b can be formed on a front side portion of the intermediate storage casing 85 to permit a right portion of the crank shaft 24 to extend therethrough and to support the crank shaft 24 via a bearing 28 (see FIG. 3) therebetween.

An annular cooling water channel 85c can be formed on an outer peripheral portion of the hole 85a on the right side of the intermediate storage casing 85, and an open side of the cooling water channel 85c can be covered by a ring-shaped closure member 29, as shown in FIG. 12. As shown in FIG. 13, the intermediate gear portion 26 can be mounted to the right side of the intermediate storage casing 85 through a substantially triangular journal member 87 formed centrally thereof with a hole 87a.

The journal member 87 can have a pair of members with a bearing 88 (see FIG. 3) provided in the hole 87a. The intermediate gear portion 26 is interposed between the pair of journal members 87, and both sides of the shaft portion 26a are inserted into the bearings 88. The journal member 87 can be fixed to the intermediate storage casing 85 by three bolts 89, as shown in FIG. 13. Also, as shown in FIG. 14, a right side portion of the intermediate storage casing 85 can be covered by mounting the right cover portion 86 thereto.

Although not shown, the hybrid motorcycle 10 can have, in addition to the respective devices described above, respective devices required for operating of the hybrid motorcycle 10, such as fuel tank, a fuel supply system for supplying fuel to the engine 20 from the fuel tank, a throttle valve to adjust a ratio of a fuel and an air delivered to the engine 20, an ignition device, a control device including CPU, ROM, RAM, a timer, etc., and a main switch, etc.

An operation of the drive unit DY at the time of running of the hybrid motorcycle 10 is determined by a running state of the hybrid motorcycle 10 and a charge state of the battery 42. First, an operation of the drive unit DY in the case where a charge amount of the battery 42 is over a predetermined value will be described. In this case, when the hybrid motorcycle 10 starts and runs under a light load, only a drive force of the motor 50 causes the hybrid motorcycle 10 to start and run. In addition, since a charge amount of the battery 42 is over a predetermined value, the generator 40 does not generate electric power and the engine 20 is left stopped.

When the battery 42 supplies electric power to the motor 50 to operate the motor 50, the motor shaft 52 rotates and the ring gear 35 rotates together with the motor shaft 52. After a rotating drive force of the ring gear 35 is transmitted to the reduction device 60 through the chain 36, it is further transmitted to the drive-wheel transmission device 70 to rotationally drive the rear wheel 11b. As the ring gear 35 rotates, the planetary gears 33a, 33b, 33c, 33d rotate in the same direction as the ring gear 35. Further, as the planetary gears 33a, 33b, 33c, 33d rotate, the sun gear 34 rotates in an opposite direction to the rotation of the planetary gears 33a, 33b, 33c, 33d.

Rotation of the rotor shaft 41 of the generator 40 is synchronizes with the rotation of the motor shaft 52 to rotate the sun gear 34 in an opposite direction to the ring gear 35 so that cranking is not generated (e.g., transmission of torque to the crank shaft 24 of the engine 20 to reciprocate the piston 22). Thereby, it is possible to stop revolution of the planetary gears 33a, 33b, 33c, 33d and rotation of the carrier shaft 31.

Consequently, a drive force of the motor 50 is not transmitted to the crank shaft 24 and the hybrid motorcycle 10 uses only by the drive force of the motor 50 to start and run. During a state of steady operation, in which the engine 20 can operate at a favorable fuel efficiency, the hybrid motorcycle 10 can run using a drive force provided by both the engine 20 and the motor 50. In this case, a drive force generated by actuation of the engine 20 is divided by the power distributing device 30 between a drive force for driving the rear wheel 11b and a drive force to operate the generator 40 to generate electric power that is supplied to the motor 50.

That is, when the engine 20 is actuated, a drive force of the engine 20 is transmitted to the planetary carrier 32 through the crank shaft 24 and the carrier shaft 31, so that the planetary carrier 32 rotates. As the planetary carrier 32 rotates, the planetary gears 33a, 33b, 33c, 33d revolve and rotate about the planetary pins 32b, 32c, 32d, 32e. Further, as the planetary gears 33a, 33b, 33c, 33d rotate, the ring gear 35 rotates and a rotating drive force of the ring gear 35 is transmitted to the reduction device 60 through the sprocket 37 and the chain 36.

The drive force transmitted to the reduction device 60 is transmitted to the rear wheel 11b through the drive-wheel transmission device 70, the wheel 74, etc. to rotate the rear wheel 11b. On the other hand, when the sun gear 34 rotates as the planetary gears 33a, 33b, 33c, 33d rotate, the rotor shaft 41 of the generator 40 rotates, so that the generator 40 generates electric power. Electric power generated by the generator 40 can be used to drive the motor 50 and a drive force generated by the motor 50 can also be used to drive the rear wheel 11b.

Also, when a high output is required (e.g., to accelerate or climb a slope), the rotational speed of the engine 20 can be increased, and electric power generated by the generator 40 and stored in the battery 42 can be supplied to the motor 50. Therefore, both a drive force from the engine 20 and a drive force from the motor 50 can be increased so that the hybrid motorcycle 10 can operate smoothly to accelerate or climb a slope.

When the hybrid motorcycle 10 is decelerated or braked, braking of the engine 20 is actuated. That is, the motor shaft 52 and the ring gear 35 are rotated by a drive force from the rear wheel 11b and the planetary gears 33a, 33b, 33c, 33d, the planetary carrier 32, and the sun gear 34 rotate accordingly. Rotation of the motor shaft 52 causes the motor 50 to generate electric power and the generated electric power is supplied to the generator 40 to increase a rotating speed of the rotor shaft 41, whereby rotation of the sun gear 34 is controlled and engine braking is appropriately actuated. Preferably, the rotating speed of the rotor shaft 41 is in a range below a predetermined value to inhibit over-speeding of the rotor shaft 41.

An operation of the drive unit DY in the case where a charge amount of the battery 42 is not more than the predetermined value will now be described. In this case, the battery 42 first supplies electric power to the generator 40 to cause the generator 40 to function as a sel-motor and the engine 20 is started by a drive force from the generator 40. After the engine 20 is started, supply of electric power to the generator 40 is stopped. A drive force generated by the engine 20 causes the planetary carrier 32 of the power distributing device 30 to revolve, and the sun gear 34 is rotated by rotation of the planetary gears 33a, 33b, 33c, 33d. The sun gear 34 rotates the rotor shaft 41 so as to cause the generator 40 to generate electric power.

The electric power generated by the generator 40 is charged to the battery 42. The hybrid motorcycle 10 stops and the ring gear 35 and the motor shaft 52 are stopped in rotation. In order to stop rotation of the motor shaft 52, electric power from the battery 42 or the generator 40 is supplied to the motor 50. When the hybrid motorcycle 10 is caused to start and run under a light load, electric power generated by the generator 40 with the use of a drive force from the engine 20 charges electricity in the battery 42, while a drive force of the motor 50 causes the hybrid motorcycle 10 to start and run.

The motor 50 is driven whereby the rear wheel 11b is rotationally driven through the ring gear 35, the chain 36, the reduction device 60, and the drive-wheel transmission device 70. As the ring gear 35 rotates, the planetary gears 33a, 33b, 33c, 33d rotate, and further as the planetary gears 33a, 33b, 33c, 33d rotate, the planetary carrier 32 rotates but the planetary carrier 32 continues to rotate since it does not cease rotating during idling of the engine 20. Upon rotation of the planetary carrier 32, the sun gear 34 rotates and the generator 40 generates electric power, the electric power being charged to the battery 42.

Also, when the hybrid motorcycle 10 reaches a steady running state, the hybrid motorcycle 10 can operate as described above when the battery 42 is over the predetermined value. Electric power generated by the generator 40 is used for charging of the battery 42 as well as for driving of the motor 50 until a charge amount of the battery 42 exceeds the predetermined value. Further, when the hybrid motorcycle 10 accelerates or climbs a slope, the motorcycle 10 operates as described above where the battery 42 is over the predetermined value. Electric power from the battery 42 is not supplied to the motor 50 until a charge amount of the battery 42 exceeds the predetermined value, and acceleration is achieved by a total of a drive force from the motor 50, via a maximum electric power supplied to the motor 50 by the generator 40, and a drive force of the engine 20.

Also, when the hybrid motorcycle 10 should be decelerated or braked, a drive force from the rear wheel 11b causes the ring gear 35 and the motor shaft 52 to rotate and a decelerating force is generated via a regenerating brake provided by causing the motor 50 to generate electric power. The planetary gears 33a, 33b, 33c, 33d, the planetary carrier 32, the sun gear 34, and the rotor shaft 41 of the generator 40 rotate while electric power is supplied to the generator 40 and the rotating speed of the rotor shaft 41 is controlled to remain below an overspeed value. Thereby, rotation of the sun gear 34 is controlled and hence engine braking can be appropriately actuated.

In this manner, with one embodiment of the hybrid motorcycle 10, the power distributing device 30 can be positioned between the generator 40 and the motor 50 and the reduction device 60 can be arranged rearwardly of the power distributing device 30. The front end of the drive-wheel transmission device 70 can be journaled by the rear end of the central storage casing 80, which receives therein the reduction device 60. Therefore, the drive-wheel transmission device 70 can be made as close to a center of a vehicle width as possible, so that it is possible to provide the drive unit DY of the hybrid motorcycle 10 in a compact manner. Also, since the central storage casing 80, which receives therein the reduction device 60, can form part of the drive unit DY and journals the drive-wheel transmission device 70, any specific journal member to journal the drive-wheel transmission device 70 is made unnecessary.

Further, since the drive-wheel transmission device 70 is mounted to the central storage casing 80, both a construction by which a drive force is transmitted to the drive-wheel transmission device 70 from the reduction device 60, and a construction by which the drive-wheel transmission device 70 is journaled on the reduction device 60 can be made simple. Also, since the central storage casing 80 can be high in stiffness and strength, it is possible to firmly journal the drive-wheel transmission device 70. Also, a portion of the hybrid motorcycle 10 in the vehicle width direction can be structured in a compact manner by adopting the planetary gear mechanism as the power distributing device 30, forming the rotor shaft 41 of the generator 40 and the sun gear 34 to make the same hollow, and arranging the carrier shaft 31 in the hollow portion of the rotor shaft 41.

Further, since the carrier shaft 31 projects from the rotor shaft 41 of the generator 40 and the crank shaft 24 is connected through the intermediate gear portion 26 to the projected end of the carrier shaft 3 1, a construction by which torque of the crank shaft 24 is transmitted to the carrier shaft 31 can be simplified and connection thereof made easy. Also, since the integral, central storage casing 80 can accommodates therein the crank shaft 24, the power distributing device 30, and the reduction device 60, it is possible to make the drive unit DY substantially rigid.

Also, since the single, central storage casing 80 constitutes a storage casing, which can accommodate therein the crank shaft 24, the power distributing device 30, and the reduction device 60, the drive-wheel transmission device 70 can be further firmly journaled on the body side of the drive unit DY. Further, since the front end of the drive-wheel transmission device 70 is formed to bifurcate and respective ends of the bifurcated portion are journaled by both left and right sides of the rear end of the central storage casing 80, the drive-wheel transmission device 70 can be further firmly journaled on the body side of the drive unit DY firm. Also, the drive-wheel transmission device 70 can be mounted to the central storage casing 80 in a well-balanced manner.

Also, since the cooling water pump 54 can be provided in a dead space forwardly of the motor 50 to supply cooling water to respective devices provided on the drive unit DY to cool the same, the drive unit DY can be constituted in a compact manner. Further, since the journal member 87 having a pair of members can be fixed to the intermediate storage casing 85 by three bolts 89, the intermediate gear portion 26 can be firmly supported without being influenced by the cooling water channel 85c.

The hybrid motorcycle 10 is not limited to the embodiment described above but can be appropriately changed and embodied. For example, while the engine 20 has a single cylinder in the embodiment described above, the engine 20 can have two or more cylinders. A drive force of the crank shaft 24 can then be transmitted to the carrier shaft 31 of the power distributing device 30 from portions disposed between the cylinders. Also, the carrier shaft 31 may project toward the motor 50 and the intermediate gear portion 26 may be arranged on a left portion of the drive unit DY to permit a drive force of the crank shaft 24 to be transmitted to the carrier shaft 31.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A hybrid two-wheeled vehicle, comprising:
   an engine comprising a crank shaft extending in a direction generally transverse to a longitudinal axis of the motorcycle;
   a generator configured to generate electric power upon rotation of the crank shaft of the engine;
   an electric motor driven by at least the electric power generated by the generator, the motor configured to rotate a drive wheel via at least a reduction device and a drive-wheel transmission device; and
   a power distributing device configured to distribute a crank shaft drive force generated by the engine to at least the generator and the reduction device,
   the generator, the motor, and the power distributing device being arranged on an axis that is rearwardly spaced from and generally parallel to the crank shaft, and being disposed such that the power distributing device is positioned between the generator and the motor, the reduction device being arranged rearwardly of the power distributing device, and a front end of the drive-wheel transmission device being journaled on a reduction device storage casing that receives therein the reduction device, so that a rear end of the drive-wheel transmission device is vertically swingable and the drive wheel is journaled on a rear end of the drive-wheel transmission device.

2. The hybrid vehicle according to claim 1, wherein the power distributing device comprises a sun gear connected coaxially to a rotor shaft of the generator, a plurality of planetary gears arranged around the sun gear to mesh with the sun gear, a planetary carrier that rotatably supports the planetary gears, and a ring gear arranged around the planetary gears to mesh with the planetary gears, the ring gear disposed rotatably about a carrier shaft on the planetary carrier to transmit torque of the carrier shaft to the reduction device.

3. The hybrid vehicle according to claim 2, wherein at least one of a motor shaft provided on the motor and the rotor shaft of the generator comprises a hollow portion, and the carrier shaft of the planetary carrier is rotatably disposed at least partially in the hollow portion.

4. The hybrid vehicle according to claim 3, wherein the carrier shaft projects from a shaft end of the motor shaft or the rotor shaft, both of which are hollow, and rotation of the crank shaft is transmitted through a drive force transmission mechanism to the carrier shaft.

5. The hybrid vehicle according to claim 1, wherein a power distributing device storage casing that receives therein at least the power distributing device is integral with the reduction device storage casing.

6. The hybrid vehicle according to claim 5, wherein a crank case, which journals the crank shaft is integral with the power distributing device storage casing and the reduction device storage casing.

7. The hybrid vehicle according to claim 1, wherein the front end of the drive-wheel transmission device is formed to bifurcate and respective ends of the bifurcated portion are journaled on both left and right sides of the reduction device storage casing.

8. A hybrid two-wheeled vehicle, comprising:
   an engine comprising a crank shaft extending in a direction generally transverse to a longitudinal axis of the motorcycle;
   a generator configured to generate electric power at least upon rotation of the crank shaft;
   an electric motor driven by at least the electric power generated by the generator, the motor configured to rotate a drive wheel of the motorcycle via at least a reduction device and a drive-wheel transmission device; and
   a power distributing device configured to distribute a drive force generated by the engine to at least the generator and the reduction device, the generator, the motor, and the power distributing device being arranged on an axis that is rearwardly spaced from and generally parallel to the crank shaft, and disposed such that the power distributing device is positioned between the generator and the motor.

9. The hybrid vehicle according to claim 8, wherein the reduction device is arranged rearwardly of the power distributing device and a front end of the drive-wheel transmission device is journaled on a reduction device storage casing that receives therein at least a portion of the reduction device, so that a rear end of the drive-wheel transmission device is swingable and the drive wheel is journaled on a rear end of the drive-wheel transmission device.

10. The hybrid vehicle according to claim 8, wherein the power distributing device comprises a sun gear connected coaxially to a rotor shaft of the generator, a plurality of planetary gears arranged around the sun gear to mesh with the sun gear, a planetary carrier that rotatably supports the planetary gears, and a ring gear arranged around the planetary gears to mesh with the planetary gears, the ring gear disposed rotatably about a carrier shaft on the planetary carrier to transmit torque from the carrier shaft to the reduction device.

11. The hybrid vehicle according to claim 10, wherein at least one of a motor shaft provided on the motor and the rotor shaft of the generator comprises a hollow portion, and the carrier shaft of the planetary carrier is rotatably disposed at least partially in the hollow portion.

* * * * *

UNITED STATES PATENT AND TRADEMARK OFFICE
CERTIFICATE OF CORRECTION

PATENT NO. : 7,431,112 B2 Page 1 of 1
APPLICATION NO. : 11/675452
DATED : October 7, 2008
INVENTOR(S) : Tatsuyuki Masuda, Toshinori Fukudome and Shinji Sasamoto It is certified that error appears in the above-identified patent and that said Letters Patent is hereby corrected as shown below:

At Column 3, line 65, after "thereof" insert --.--.

At Column 5, line 4, please change "thereof" to --thereof.--.

At Column 10, line 53, please change "3 1" to --31--.

At Column 11, line 32, after "thereof" insert --.--.

Signed and Sealed this

Second Day of June, 2009

JOHN DOLL
*Acting Director of the United States Patent and Trademark Office*